United States Patent [19]

Tortolo

[11] 4,049,853

[45] Sept. 20, 1977

[54] TERRAZZO STRUCTURE HAVING A SUB-SURFACE AND AN INTERMEDIATE IMPERMEABLE SHEET

[76] Inventor: Norman Patrick Tortolo, 20 Ellins Avenue, Toronto, Ontario, M6N 2A3, Canada

[21] Appl. No.: 698,616

[22] Filed: June 21, 1976

Related U.S. Application Data

[63] Continuation-in-part of Ser. No. 511,010, Oct. 1, 1974, abandoned.

[30] Foreign Application Priority Data

Oct. 1, 1975 Canada .................................. 236850

[51] Int. Cl.² .......................... B32B 5/28; B32B 13/12
[52] U.S. Cl. .......................................... 428/70; 156/71;
156/77; 156/45; 156/330; 156/331; 428/310;
428/414; 428/228; 428/236; 428/245; 428/454;
428/415; 428/441; 428/442; 428/448; 428/451;
428/317; 428/508; 428/518; 428/519; 428/520;
428/538; 428/496; 428/494; 156/338

[58] Field of Search .............. 428/519, 518, 520, 511,
428/415, 414, 538, 310, 70, 441, 442, 508, 496,
494, 317; 156/71

[56] References Cited

U.S. PATENT DOCUMENTS

| 3,231,457 | 1/1966 | Meissner | 428/317 |
| 3,344,011 | 9/1967 | Goozner | 161/44 |
| 3,401,069 | 9/1968 | Lorentzen | 428/315 X |
| 3,753,849 | 8/1973 | Duff | 428/414 |

*Primary Examiner*—Patricia C. Ives
*Attorney, Agent, or Firm*—Arne I. Fors

[57] ABSTRACT

An improved terrazzo floor or wall construction of reduced thickness bonded and adhesively secured to an underlying sub-surface through the medium of an intermediate liquid impermeable sheet. A frangible terrazzo veneer is bonded to the liquid impermeable sheet and the sheet in turn is adhesively secured to the underlying sub-surface by a rubberized asphalt or the like elastomeric material to permit lateral movement of the sub-surface relative to the said facing veneer to obviate cracking of the veneer due to cracking or lateral movement of the sub-surface.

17 Claims, 2 Drawing Figures

TERRAZZO STRUCTURE HAVING A SUB-SURFACE AND AN INTERMEDIATE IMPERMEABLE SHEET

This application is a continuation in part of application Ser. No. 511,010 filed Oct. 1, 1974, now abandoned.

BACKGROUND OF THE INVENTION

This invention relates to a method of attaching or installing, in the construction of a wall or floor, an upper or outer thin veneer facing of frangible cementitious material such as, for example, terrazzo topping, onto a sub-surface of concrete.

A common method of making a terrazzo floor comprises applying a mortar underbed about two inches thick reinforced with wire mesh to a structural concrete slab and topping the mortar underbed with a layer of terrazzo of about one-half inch thickness for a resulting two and one-half to three inch floor thickness. However, the resulting concrete structural slab sub-surface tends to crack or move due to the presence of moisture, due to expansion and contraction from temperature changes, and to other causes which may include stresses, rupture or settling. In that the terrazzo topping is intimately bonded to the sub-surface by the mortar underbed, both of which are brittle and frangible, cracking or movement of the concrete sub-surface normally causes corresponding cracking and destruction of the terrazzo topping.

The thick combination of mortar underbed and terrazzo topping exerts a considerable total weight load on the supporting floor joists and, in multistory commercial and industrial buildings, necessitates the use of oversize construction members to carry the cumulative weight load from many floors. In addition, the thick terrazzo floor often presents problems in achieving a uniform floor height from room to room on the same level if certain floors are, for example, covered with broadloom or wood veneers.

Thin terrazzo floors have been constructed directly on the concrete slab sub-surface in attempts to overcome the aforementioned problems. However, the terrazzo veneer often will separate from the underlying slab sub-surface and "resonate", i.e. will vibrate, from pedestrian traffic thereon with resulting cracking and deterioration. Also, the frangible thin terrazzo veneer, without a mortar underbed, is particularly sensitive and prone to cracking due to movement of the concrete slab sub-surface.

This invention precludes the need for the mortar underbed normally required and provides a novel composite structure which substantially obviates cracking in the fragible upper or outer thin veneer facing due to fracture, cracking or other movement of the underlying sub-surface, reduces floor thickness and minimizes floor weight, while permitting the application of a facing veneer, such as a thin layer of terrazzo, as a wet slurry mix.

STATEMENT OF INVENTION

In accord with this invention, a pre-manufactured intermediate sheet, which is impermeable to liquid, is attached by an elastomeric adhesive to the sub-surface and bonded to the fragible upper or outer thin veneer facing. The adhesive may be of any type which, in its function of holding the intermediate sheet to the sub-surface, will, through elasticity or flow, permit movement of the sub-surface laterally without transmitting the stresses due to movement through the liquid impermeable sheet, and may comprise a single layer of composite layer.

In more detail, the composite structure of the invention comprises, in combination, a concrete sub-surface, a sheet of flexible pre-manufactured liquid impermeable material, means adhesively securing said sheet to said concrete sub-surface, a frangible thin veneer facing of cementitious material, and means bonding said veneer facing to said liquid impermeable sheet, said bonding means including a bonding agent compatible with said sheet material and with said facing veneer which is applied in the form of a wet slurry mix, and said adhesive means permitting lateral movement of said concrete sub-surface relative to said thin facing veneer.

The method of applying the said structure comprises: causing adherence of a pre-manufactured liquid impermeable sheet to a concrete sub-surface by an adhesive and applying said frangible veneer thereover while in a wet slurry state and bonding said frangible veneer to said liquid impermeable sheet through a bonding agent compatible with said impermeable sheet and facing veneer, wherein the adhesive is selected so that said adhesive will allow lateral movement of said concrete sub-surface relative to said thin frangible veneer.

The liquid-impermeable sheet adhering to the concrete sub-floor is bonded through a bonding agent to a terrazzo or the like topping poured, placed or otherwise installed thereover. There is thus produced a construction wherein a terrazzo floor may be produced appearing similar to those produced previously, but is substantially reduced in thickness, and wherein the lateral movement of the concrete sub-floor, due to cracking or otherwise, is absorbed by the elastomeric adhesive joining the concrete sub-floor to the liquid-impermeable sheet, and cracking of the terrazzo is thus prevented since the concrete sub-surface and terrazzo topping are not rigidly bonded together. The invention is not confined to application to a horizontal surface but may also be used with vertical surfaces for attaching a terrazzo veneer to a concrete sub-wall. Similarly, the invention is equally applicable where the outer wall or floor surface is not terrazzo, but includes, and the term "terrazzo" is intended to include, such equally frangible cemetitious outer layers applied as wet slurry mixes such as new concrete, stucco and portland cement and sand mixes attached to the sub-floor or sub-wall. The sub-surface normally is concrete but can be formed of masonry.

BRIEF DESCRIPTION OF THE DRAWINGS

In drawings which illustrate preferred embodiments of the invention.

DESCRIPTION OF THE PREFERRED EMBODIMENTS

Figure 1:
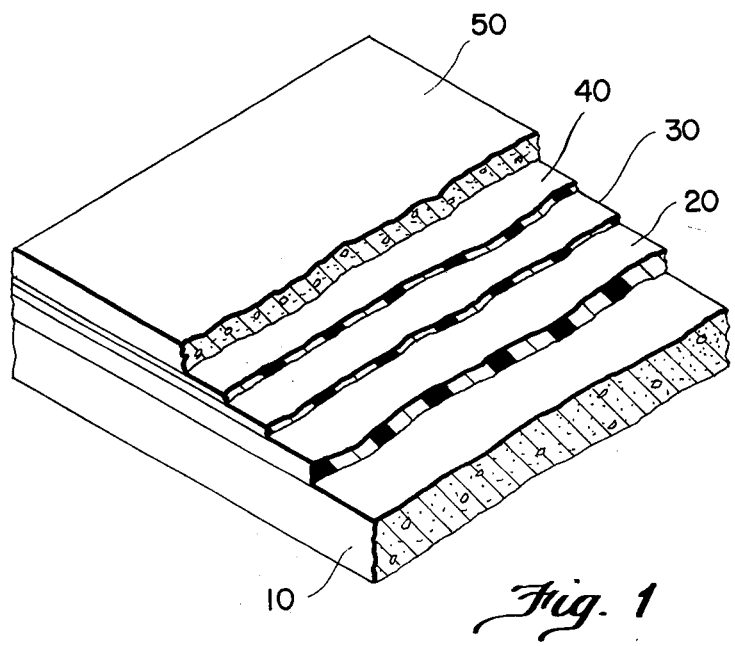
FIG. 1 shows a perspective view, partly cut away, of a floor construction in accord with the invention.

FIG. 1 of the drawings, which shows a preferred embodiment of the invention, illustrates a small section of concrete sub-floor 10 with the adhesive layer 20 attaching the intermediate sheet 30 thereto. The intermediate sheet is in turn bonded to the upper or outer layer of terrazzo veneer 50 by bonding agent 40 which, as illustrated, penetrates the upper portion of the intermediate sheet 30 and the adjacent depths of the terrazzo.

The concrete sub-surface, as previously explained, may be concrete sub-floor or may be a concrete or masonry sub-wall, it being noted that in such arrangements the terrazzo 50 conventionally is trowelled or rolled on over the bonding agent 40. The concrete sub-wall and the inventive construction may, of course, be an exterior or interior installation.

The liquid-impermeable sheet can be an organic polymer such as polyethylene or polyvinyl chloride, an elastomer such as natural rubber or a copolymer of styrene-butadiene, reinforced with glass fibre, if desired, or a fabric such as canvas known as Egyptian cotton, burlap, cotton, woven glass fibre or the like impregnated with latex by dipping or spraying.

A number of alternatives exist for the methods of achieving adhesion between the said liquid-impermeable sheet and the underlying sub-surface on the one hand, and bonding between the liquid-impermeable sheet and frangible thin terrazzo facing on the other hand.

In one alternative, the liquid-impermeable sheet formed of polyvinyl chloride may be provided with a fabric or porous layer on one or both sides thereof. The fabric or porous layer attached to the liquid-impermeable sheet is adapted, through its pores or interstices, to receive an adhesive or a bonding agent to attach the liquid-impermeable sheet to an adjacent layer. The fabric or porous layer on each side will preferably be attached by being partially embedded in the liquid-impermeable layer material during its manufacture rather than merely attached thereto by adhesive.

Examples of fabric layers which have been found suitable, both with the bonding agent for the terrazzo topping, or equivalent, on one side of the liquid-impermeable sheet, and with the adhesive for the concrete sub-layer, on the other side of the liquid-impermeable sheet, include: burlap, drill, jersey and sateen. Canvas fabric is suitable as a liquid-impermeable sheet and its fabric texture provides good adhesion between the sheet and underlying adhesive or overlying bonding agent.

The fabric layer may be dispensed with on the side of the liquid-impermeable sheet facing the concrete sub-surface with the use of suitable adhesive pre-applied during manufacture of the liquid-impermeable sheet, to be described, but is required when the adhesive is applied to the sub-surface at the time of installation.

The adhesive for attaching the intermediate layer to the concrete sub-surface can be applied to the concrete after the latter is cured. The adhesive layer, of up to about one-fourth inch and preferably about one-sixteenth to one-eighth inch thickness, may be of any suitable type of material and thickness which will stretch over limited areas to allow the concrete sub-surface to move laterally relative to the terrazzo topping or other superimposed layer under shifting or cracking of the concrete sub-floor. A suitable adhesive is sold under the trade mark "Flintlastic 790-11" and manufactured by the Flintkote Company of Canada Limited.

Where the adhesive is to be pre-applied during manufacture of the layer, a suitable liquid impermeable sheet is that sold under the trade mark "BITHUTHENE" manufactured by Grace Construction Product. This product is a high-density, cross-laminated polyethylene sheet of about 4 mils. thickness with a pre-applied adhesive of rubberized asphalt of about one-sixteenth inch thickness on one side thereof.

A filler such as fine sand or lightweight aggregate such as expanded clay, shale (sold under the trade mark "HAYDITE" manufactured by Domtar Construction Materials Limited) or slag can be incorporated in the rubberized asphalt in an amount of not more than about 2:1 by weight filler to rubberized asphalt.

Figure 2:
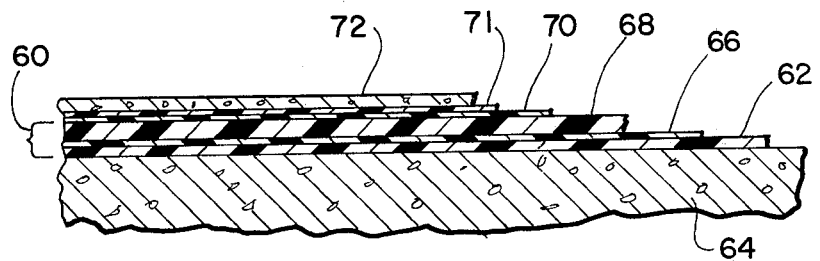
FIG. 2 shows a cross-section of a second embodiment of the floor construction of the invention.

FIG. 2 illustrates another embodiment of my invention in which the adhesive means comprise a composite layer designated by the number 60 having a first relatively thin adhesive layer 62 of, for example, "Flintkote Fast-Set-Brush-On Cement", a trade mark of Flintkote Company of Canada Limited, adapted to adhere an organic sheet 66 of polyethylene or polyvinyl chloride of about 8 mils. thickness to concrete sub-floor 64 and a second adhesive layer 68 of rubberized asphalt of about one-sixteenth inch thickness adhered to the upper surface of sheet 66 and adapted to adhere to intermediate liquid-impermeable sheet 70.

Bonding agent 71 attaches terrazzo veneer 72 to sheet 70. Adhesive layer 68 provides an effective slip-plane between concrete sub-surface 64 terrazzo veneer 72. Sheet 66 can also be formed of a textured fabric such as canvas, burlap, drill, jersey or sateen.

The bonding agent 40,71 may be any type which will attach to the liquid impermeable layer and/or fabric layer, and to the terrazzo topping. Suitable bonding agents include aqueous resinous latex emulsion such as "Weldbond" sold by Frank T. Ross & Sons (1962) Limited, "Weldcrete" referred to hereafter; and epoxy resins.

The bonding agent can be applied by brushing or spraying in a thickness of about 2 mils. onto the intermediate sheet shortly before pouring of the terrazzo topping or pre-applied before laying of the intermediate sheet. If applied to an installed sheet, the bonding agent normally is permitted to set or cure for a time sufficient to allow the bonding agent to become tacky.

When the bonding agent is pre-applied to the liquid-impermeable sheet, the bonding agent can be pre-wetted with water before the terrazzo is applied or wetted by the water of the terrazzo slurry mix. For pre-application of the bonding agent during manufacture of the sheet I prefer to use "Weldcrete", a product of Larsen Products Corp. This product is applied wet to one side of the liquid impermeable sheet during its manufacture and allowed to dry. It then remains inactive until the time of use. The terrazzo topping is poured onto the bonding agent as a wet slurry mix to form a five-eighth inch thin veneer facing, permitting permeation of the bonding agent onto the adjacent depths of the terrazzo topping. When the topping thus attached by the bonding agent has been smoothed by trowelling or the like, it may be finished in accord with conventional techniques.

The liquid-impermeable sheet, if selected from an organic material such as polyethylene or polyvinyl chloride, preferably is abraded by buffing to roughen the surface texture of the side to be bonded to the facing veneer. I have found wet or dry buffing with No. 400 silicon carbide sandpaper or No. 200 garnet sandpaper satisfactory.

In addition to buffing of the surface of the liquid-impermeable sheet, contact cements such as known by the trade mark "Wall Strap", manufactured by LePages Limited, can be applied to the liquid-impermeable sheet in concentrated or diluted form by rolling, brushing or spraying, to a thickness of up to about 4 mils., during premanufacture to provide a further roughened surface texture. The sheet of polyethylene with a layer of applied contact cement, for example, can be heated to the softening temperature of the sheet to fuse the contact cement to the sheet.

A clay filler such as one of portland cement, silica or limestone dust, or combination thereof, added to the contact cement in an amount of about 2% by weight, can be added to improve drying of the contact cement and to increase the roughness of surface texture of the intermediate sheet.

The present invention provides a number of important advantages. A thin floor facing veneer of terrazzo or the like cementitious frangible material, applied over a sub-floor such as concrete or masonry wall, can be provided which has the outward physical characteristics of a conventional terrazzo floor, but with a reduction of floor thickness of about two inches by obviating the need for a mortar underbed, and wherein should the concrete sub-floor or masonry wall crack or shift, no corresponding fracture or cracking takes place in the terrazzo topping due to the presence of the rubberized asphalt layer. It is noted that bonding of the facing veneer to the sub-floor or sub-wall through the medium of the intermediate sheet simulates the monolithic terrazzo mass of a conventional terrazzo floor required to prevent "bounce" or reverberation of the superimposed layer, which could otherwise result in separation of the facing from the sub-surface due to the light weight of the terrazzo. In addition, the liquid impermeable sheet seals and isolates the solvents present in the rubberized asphalt layer from the terrazzo facing veneer to prevent discoloration of the veneer.

It will be understood, of course, that modifications can be made in the preferred embodiment of the present invention as described hereinabove without departing from the scope and purview of the appended claims.

What I claim as new and desire to protect by Letters Patent of the United States is:

1. In combination, a sub-surface, a sheet of flexible pre-manufactured liquid impermeable material, an elastomeric adhesive securing said sheet to said sub-surface, a frangible thin facing veneer, and a bonding agent securing said facing veneer to said liquid impermeable sheet, said bonding agent compatible with said sheet material and with said facing veneer whereby said facing veneer is rigidly secured to said liquid impermeable sheet, which facing veneer is applied in the form of a wet slurry mix, said elastomeric adhesive permitting lateral movement of said sub-surface relative to said facing veneer.

2. A structure according to claim 1 wherein said sheet of liquid impermeable material is polyethylene or polyvinyl chloride and the side to which the facing veneer is bonded is abraded to roughen surface texture.

3. A structure according to claim 2 wherein said bonding agent is selected from the group consisting of an aqueous resinous latex emulsion and epoxy resin.

4. A structure according to claim 1 in which the sheet material is polyethylene, the side to which the facing veneer is bonded is abraded to roughen the surface texture, a contact cement is applied thereto, and the sheet material containing the said contact cement is heated to the softening temperature thereof for intimate bonding of the contact cement to the sheet material.

5. A structure according to claim 1 in which the sheet material is polyvinyl chloride and a porous fabric is embedded in at least one side of said sheet.

6. A structure according to claim 1 in which said elastomeric adhesive comprises a composite layer of a sheet material and a layer of adhesive on each side thereof for adherence to said sheet liquid impermeable material and to said sub-surface.

7. A structure according to claim 1 in which said elastomeric adhesive is a layer of rubberized adhesive having a thickkness of about one-eighth inch and said sheet material has a thickness of from about 2 to 8 mils.

8. A structure according to claim 6 in which said adhesive for adhering the composite sheet material to the sheet liquid impermeable material is a layer of asphalt rubberized asphalt about 1/16 inch thickness.

9. A structure according to claim 3 in which said bonding agent is applied as a layer on said sheet material in a thickness of about 2 mils.

10. A method for attaching a frangible thin facing veneer to a planar sub-surface comprising: causing adherence of a pre-manufactured liquid impermeable sheet to a sub-surface by an adhesive layer and applying said frangible veneer thereover while in a wet slurry state and bonding said frangible layer to said liquid impermeable sheet through a bonding agent compatible with said impermeable sheet and facing veneer whereby said frangible layer is rigidly secured to said liquid impermeable sheet, and wherein the adhesive is selected so that said adhesive layer will allow lateral movement of said sub-surface relative to said frangible thin veneer.

11. A method as claimed in Claim 10 wherein said liquid impermeable sheet is polyvinyl chloride and attaching a layer of porous material to the sheet of liquid impermeable material on the side thereof which is bonded to said frangible thin layer.

12. A method as claimed in Claim 11, attaching said layer of porous material to said sheet of liquid impermeable material by partial embedment therein.

13. A method as claimed in claim 12, attaching said layer of porous material to one side of said sheet of liquid impermeable material by heating said sheet of liquid impermeable material to a temperature wherein said material softens whereby said layer of porous material becomes partially embedded therein.

14. A method as claimed in claim 10, wherein said liquid impermeable sheet is provided, on one side to be bonded to said frangible thin veneer, with a pre-applied water activatable bonding agent compatible with said frangible veneer and wherein said method includes the step of wetting said bonding agent before application of the frangible layer thereto and wherein said frangible veneer is applied when said bonding agent is wet.

15. A method as claimed in claim 14 wherein said liquid impermeable sheet is provided, on one side to be bonded to said frangible veneer, with a pre-applied water activatable bonding agent for said frangible veneer and wherein said method includes the step of applying said frangible veneer as a wet slurry mix whereby moisture in the slurry mix provides water to activate the bonding agent.

16. A method as claimed in claim 10 wherein said liquid impermeable sheet is polyethylene or polyvinyl chloride, abrading one surface of said liquid impermeable sheet to roughen the surface texture thereof, applying a contact cement thereto, and heating said surface to the softening temperature of the sheet whereby said contact cement dries and forms a roughened surface texture.

17. A method as claimed in claim 16, adding a finely particulate solid selected from the group consisting of clay, limestone or silica dust to the contact cement prior to application of the contact cement to the liquid impermeable sheet.

* * * * *